(12) United States Patent
He et al.

(10) Patent No.: US 7,474,638 B2
(45) Date of Patent: Jan. 6, 2009

(54) METHOD AND SYSTEM FOR DISTRIBUTED BASEBAND MEASUREMENTS

(75) Inventors: Yi He, Santa Rosa, CA (US); Xiangzhou Joe Zhang, Fremont, CA (US); John E. Neeley, Larkspur, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 881 days.

(21) Appl. No.: 10/737,432

(22) Filed: Dec. 15, 2003

(65) Prior Publication Data

US 2005/0128992 A1 Jun. 16, 2005

(51) Int. Cl.
*H04Q 7/00* (2006.01)
(52) U.S. Cl. ..................................... 370/328
(58) Field of Classification Search ................ None
See application file for complete search history.

(56) References Cited

U.S. PATENT DOCUMENTS

| | | | |
|---|---|---|---|
| 6,205,151 B1* | 3/2001 | Quay et al. ................ | 370/416 |
| 6,437,551 B1 | 8/2002 | Krulevitch et al. | |
| 6,721,581 B1* | 4/2004 | Subramanian ........... | 455/575.1 |
| 6,967,999 B2* | 11/2005 | Subramanian et al. ...... | 375/224 |
| 2002/0080728 A1* | 6/2002 | Sugar et al. ................. | 370/252 |
| 2003/0008684 A1* | 1/2003 | Ferris ......................... | 455/561 |
| 2003/0014611 A1* | 1/2003 | Ferris .......................... | 712/35 |
| 2007/0005327 A1* | 1/2007 | Ferris .......................... | 703/14 |

FOREIGN PATENT DOCUMENTS

WO    WO 02/50534    6/2002

OTHER PUBLICATIONS

Martin, Steven M., et al., A Microsystem For Near-Patient Accelerated Clotting Time Blood Tests, 39th Design Automation Conference, Jun. 10-14, 2002, pp. 1-7.
Quan, Margaret, Prepared For Defeat, Design Contestants Emerge Winners, EETimes, Jun. 21, 2002.

* cited by examiner

*Primary Examiner*—Anh-Vu H Ly

(57) ABSTRACT

A baseband measurement system includes a host and a Digital Immediate Frequency (DIF) subsystem. The DIF subsystem includes both hardware and software components, such as, for example, a microprocessor and its associated software, a FPGA, one or more ASICs, and memory. The baseband measurements are processed using the FPGA, ASICs, and the microprocessor and its software. The microprocessor controls the flow of the data in and out of the memory and distributes the processing tasks to both the hardware and software components in a cooperative manner. The microprocessor orchestrates the measurements and processing by operating as a measurement state machine. Selection of the proper component is based on the type of measurement and its processing requirements, as well as the current state of the hardware and software components. The host receives the processed data and performs post-processing operations if needed. The host also displays the processed data.

16 Claims, 4 Drawing Sheets

US 7,474,638 B2

METHOD AND SYSTEM FOR DISTRIBUTED BASEBAND MEASUREMENTS

TECHNICAL FIELD

Embodiments in accordance with the invention relate generally to digital signal analysis and measurements, and more particularly to baseband measurements. Still more particularly, embodiments in accordance with the invention relate to methods and systems for distributed baseband measurements.

BACKGROUND

Baseband measurements are utilized in a number of applications, including wireless communication systems that use communication formats such as wideband code division multiple access (WCDMA) and CDMA2000. Each wireless communication format typically uses specialized codes to provide multiple communication channels in a designated segment of the electromagnetic spectrum. Various types of baseband measurements are performed on these systems to ensure their modulation quality and compatibility.

FIG. 1 is a block diagram of a baseband measurement system in accordance with the prior art. System 100 includes a host 102 and a Digital Intermediate Frequency (DIF) subsystem 104. An IF analog signal is input into DIF subsystem 104, where an Application Specific Integrated Circuit (ASIC) or a Field Programmable Gate Array (FPGA) 106 converts the IF analog signal into a baseband signal. The baseband signal includes I and Q data, where I and Q are the in-phase and quadrature components, respectively, of an amplitude versus time series for the signal.

System 100 typically transfers the I and Q data from the DIF subsystem 104 to the host 102 for processing. Host 102 performs all of the data computations for the desired measurement algorithms, typically by batch-mode processing. Batch-mode processing captures a block of data and processes the data in software pursuant to a particular baseband measurement algorithm. The capturing and processing steps repeat as long as system 100 is in a continuous measurement mode.

A large block of time is typically required to transfer sizeable amounts of data between DIF subsystem 104 and host 102, which increases the amount of time needed to complete the measurements. Furthermore, baseband measurements can be complicated at times and require an extensive amount of digital signal processing. Performing these measurements in software is also quite time consuming, particularly with batch-mode processing.

SUMMARY

In accordance with the invention, a method and system for distributed baseband measurements is provided. A baseband measurement system includes a host and a Digital Intermediate Frequency (DIF) subsystem. The DIF subsystem includes both hardware and software components, such as, for example, a microprocessor and its associated software, a FPGA, one or more ASICs, and memory. The baseband measurements are processed using the FPGA, ASICs, and the microprocessor and its software. The microprocessor controls the flow of the data in and out of the memory and distributes the processing tasks to both the hardware and software components in a cooperative manner. The microprocessor orchestrates the measurements and processing by operating as a measurement state machine. Selection of the proper component is based on the type of measurement and its processing requirements, as well as the current state of the hardware and software components. The host receives the processed data and performs post-processing operations if needed. The host also displays the processed data.

BRIEF DESCRIPTION OF THE DRAWINGS

The invention will best be understood by reference to the following detailed description of embodiments in accordance with the invention when read in conjunction with the accompanying drawings wherein.

DETAILED DESCRIPTION

The invention relates to a method and system for distributed baseband measurements. The following description is presented to enable one skilled in the art to make and use the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Figure 1:
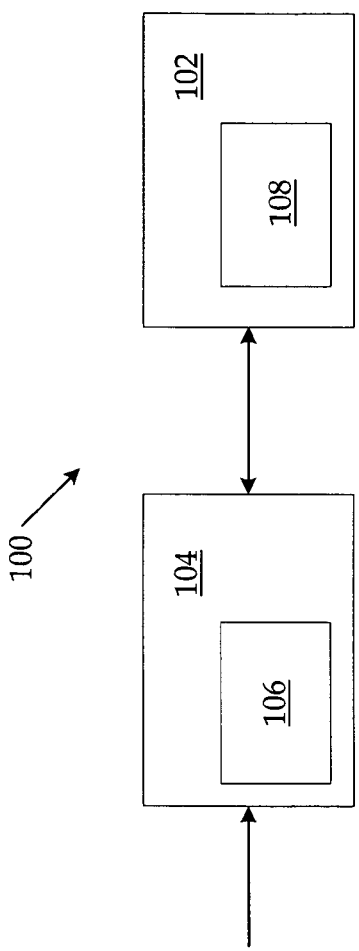
FIG. 1 is a block diagram of a baseband measurement system in accordance with the prior art.
Figure 2:
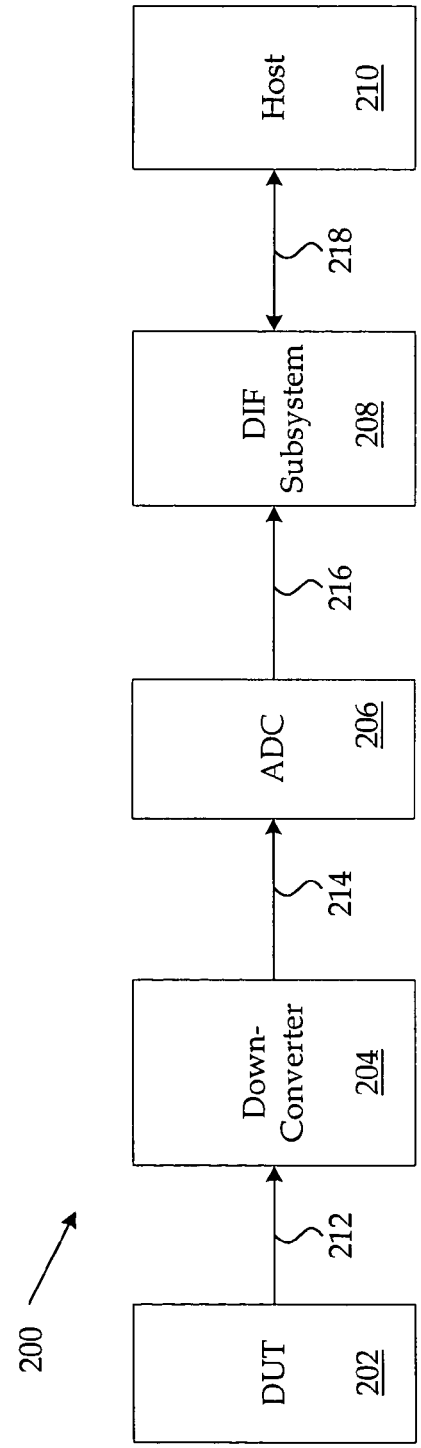
FIG. 2 is a simplified block diagram of a baseband measurement system in an embodiment in accordance with the invention.

With reference now to the figures and in particular with reference to FIG. 2, there is shown a simplified block diagram of a baseband measurement system in an embodiment in accordance with the invention. System 200 includes a device-under-test (DUT) 202, down-converter 204, analog-to-digital converter (ADC) 206, Digital Intermediate Frequency (DIF) subsystem 208, and host 210. In other embodiments in accordance with the invention, measurement system 200 may include additional elements and algorithms, such as, for example, an amplifier and low-pass filter between down-converter 204 and ADC 206.

A DUT 202 outputs a radio frequency (RF) analog signal to be tested, which is transmitted to down-converter 204 via signal line 212. Downconverter 204 converts the RF analog signal to an Intermediate Frequency (IF) analog signal. The IF analog signal is then transmitted to ADC 206 via signal line 214. ADC 206 converts the IF analog signal to an IF digital signal. The IF digital signal is then transmitted to DIF subsystem 208 via signal line 216.

DIF subsystem 208 converts the IF digital signal to a baseband signal that includes I and Q data. DIF subsystem 208 controls the data flow in this embodiment in accordance with the invention. DIF subsystem 208 distributes the processing tasks to both hardware and software components in a cooperative manner in order to achieve efficient processing of the measurement data. DIF subsystem 208 also provides flexibility to system 200 by allowing system 200 to respond quickly to evolving and customized measurements. The processed data are transferred to the host 210 via signal line 218 for any post-processing operations and to display the data.

Figure 3:
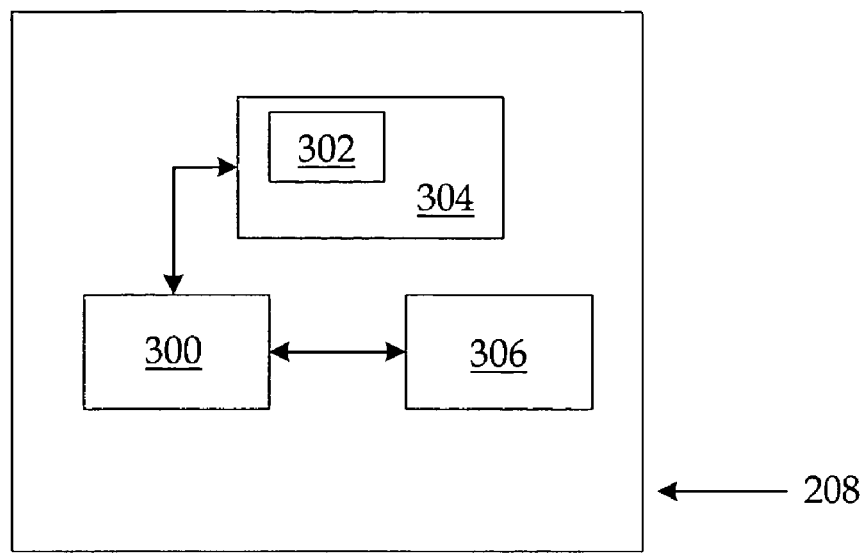
FIG. 3 is a conceptual block diagram of the Digital Intermediate Frequency subsystem shown in FIG. 2.

FIG. 3 is a conceptual block diagram of the Digital Intermediate Frequency subsystem shown in FIG. 2. DIF subsystem 208 includes one or more hardware components 300, one or more software components 302, a controller 304, and memory 306. The baseband measurements are processed using hardware components 300 and software components 302. Controller 304 controls the flow of the data in and out of memory 306 and chooses the proper component to process the data. Selection of the proper component is based on the type of measurement and its processing requirements, as well as the current state of the hardware and software components 300, 302, and 304.

Figure 4:
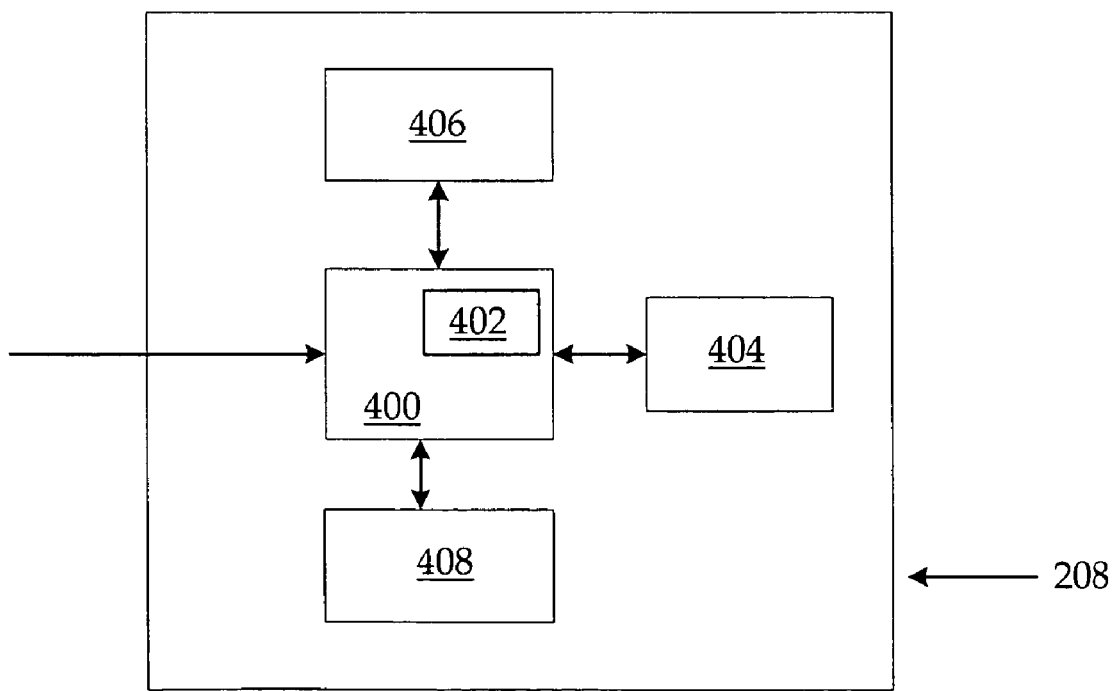
FIG. 4 is a block diagram of a Digital Intermediate Frequency subsystem according to an embodiment of FIG. 3.

Referring now to FIG. 4, there is shown a block diagram of a Digital Intermediate Frequency subsystem according to an embodiment of FIG. 3. DIF subsystem 208 includes a Field Programmable Gate Array (FPGA) 400 with internal memory 402, memory 404, microprocessor 406, and one or more application specific integrated circuits (ASICs) 408. FPGA 400 is utilized as a programmable processing engine in the FIG. 4 embodiment. FPGA 400 provides glue logic to connect the other hardware components such as ADC 206 (see FIG. 2), memory 404, microprocessor 406, and ASICs 408. FPGA 400 also performs hardware acceleration in this embodiment in accordance with the invention.

Memory 404 is implemented as a random access memory in the FIG. 4 embodiment. Memory 404 is divided into multiple blocks and the initial I and Q data are stored in one or more blocks. When the data are to be processed, the data are read from memory 404 and processed using the appropriate hardware and/or software components. The processed data are then written back into memory 404. The data can be written into the same blocks in memory 404, or the data can be written into different blocks within memory 404. In other embodiments in accordance with the invention, memory 402 temporarily stores some or all of the processed data prior to being stored in memory 404.

Microprocessor 406 orchestrates the measurements and processing by operating as a measurement state machine in this embodiment in accordance with the invention. Microprocessor 406 controls the data flow in and out of memory 404. Microprocessor 406 also selects the proper component to process the data in this embodiment in accordance with the invention.

ASICs 408 perform standard digital signal processing (DSP) functions in the FIG. 4 embodiment. Examples of standard DSP functions include, but are not limited to, Fast Fourier Transform (FFT), digital filtering, phase shifting, arbitrary re-sampling, down and up frequency conversions, and phase and frequency compensation. The registers within ASICs 408 are configured to perform the DSP functions prior to processing the data in this embodiment in accordance with the invention.

Figure 5:
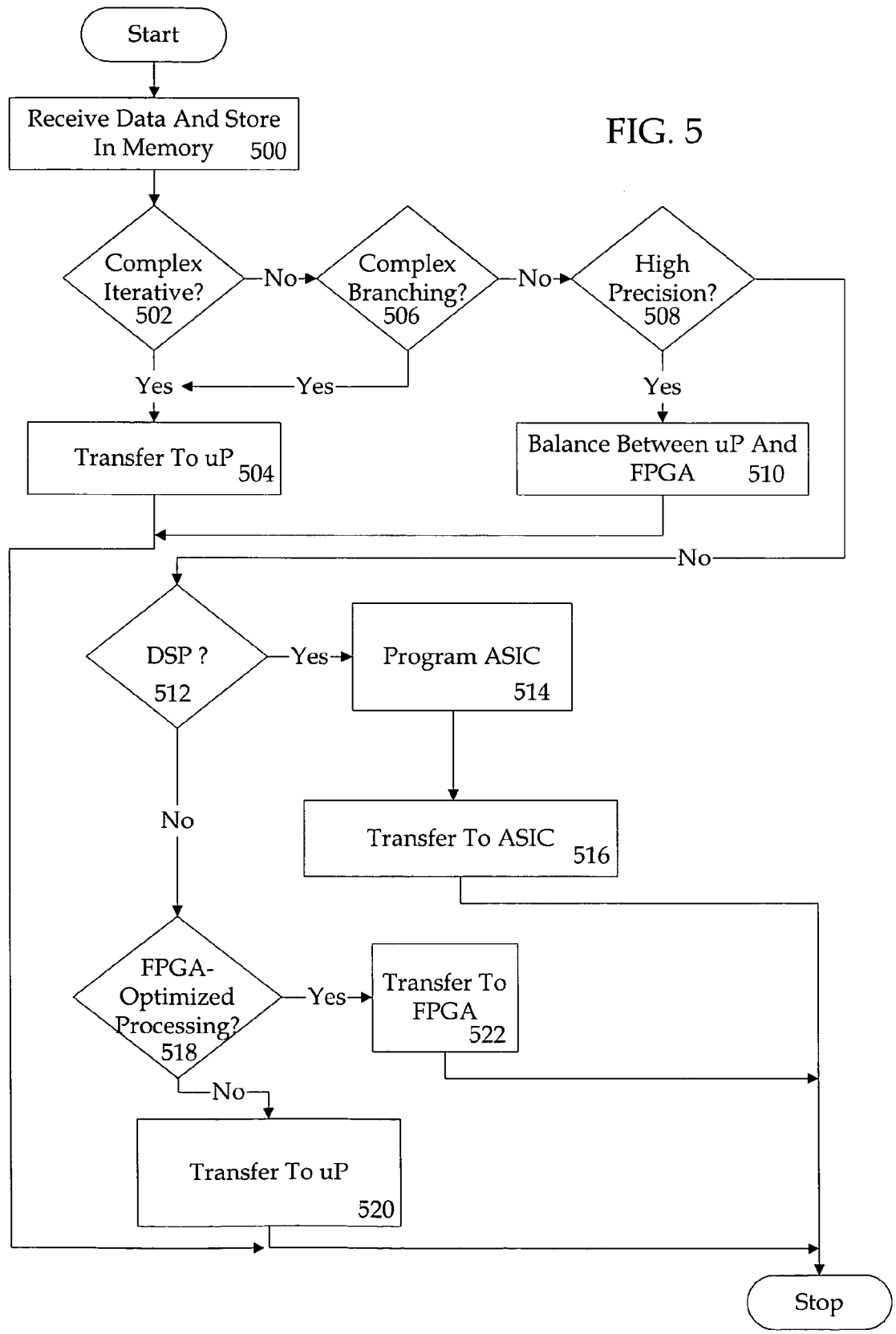
FIG. 5 is a flowchart of a method for distributed baseband measurements in accordance with an embodiment of the invention.

FIG. 5 is a flowchart of a method for distributed baseband measurements in accordance with an embodiment of the invention. When DIF system initialization is complete, the FPGA image that corresponds to the measurement algorithms to be performed is loaded into the FPGA. A library of the FPGA images may be stored in a memory that is accessible to the processor 406.

Initially measurement data are received and stored in memory, as shown in block 500. A determination is then made at block 502 as to whether a measurement algorithm includes complex iterative processing. Active channel detection in a CDMA system is one example of a measurement that involves complex iterative processing. If so, the data are processed by the microprocessor at block 504. If not, the method continues at block 506 where a determination is made as to whether the measurement algorithm includes complex branching operations. Active channel detection is also an example of a measurement that includes complex branching operations.

If the algorithm does include complex branching operations, the data are processed by the microprocessor (block 504). If not, the method continues at block 508 where a determination is made as to whether the algorithm includes high-precision operations. Symbol timing estimation and multi-parameter estimation in demodulation analysis are examples of measurement algorithms that include high-precision operations.

If the algorithm does include high-precision operations, the appropriate component (FPGA or software on the microprocessor) processes the data. Selection of the FPGA or the microprocessor software is based on optimizing the utilization of the two components and the amount of data that will be transferred to and from the respective component. In this embodiment in accordance with the invention, the microprocessor controls the selection of components to process the data.

Referring again to block 508, if the algorithm does not include high-precision operations, the method continues at block 512 where a determination is made as to whether the algorithm involves digital signal processing (DSP). Examples of some measurement algorithms that involve digital signal processing include, but are not limited to, digital filtering, cross-correlation, re-sampling, down and up frequency conversions, and phase and frequency compensation.

If the algorithm does involve digital signal processing, the method passes to block 514 where the ASIC or ASICs are configured with the appropriate algorithm. The data are then processed by the one more ASICs, as shown in block 516.

If the algorithm does not involve digital signal processing, the method continues at block 518 where a determination is made as to whether the algorithm involves FPGA-optimized processing. FPGA-optimized processing may include, but is not limited to, any processing that requires flexibility, modifications, and/or utilization of the programmability aspect of the FPGA. Examples of FPGA-optimized measurement algorithms include, but are not limited to, power measurements, de-scrambling, the Hadamard Transform, and the Cordic algorithm.

If the algorithm does not involve FPGA-optimized processing, the data are transferred to the microprocessor for processing. This step is shown in block 520. If the algorithm does involve operations optimized for FPGA processing, the data are transferred to the FPGA for processing (block 522).

Figure 6:
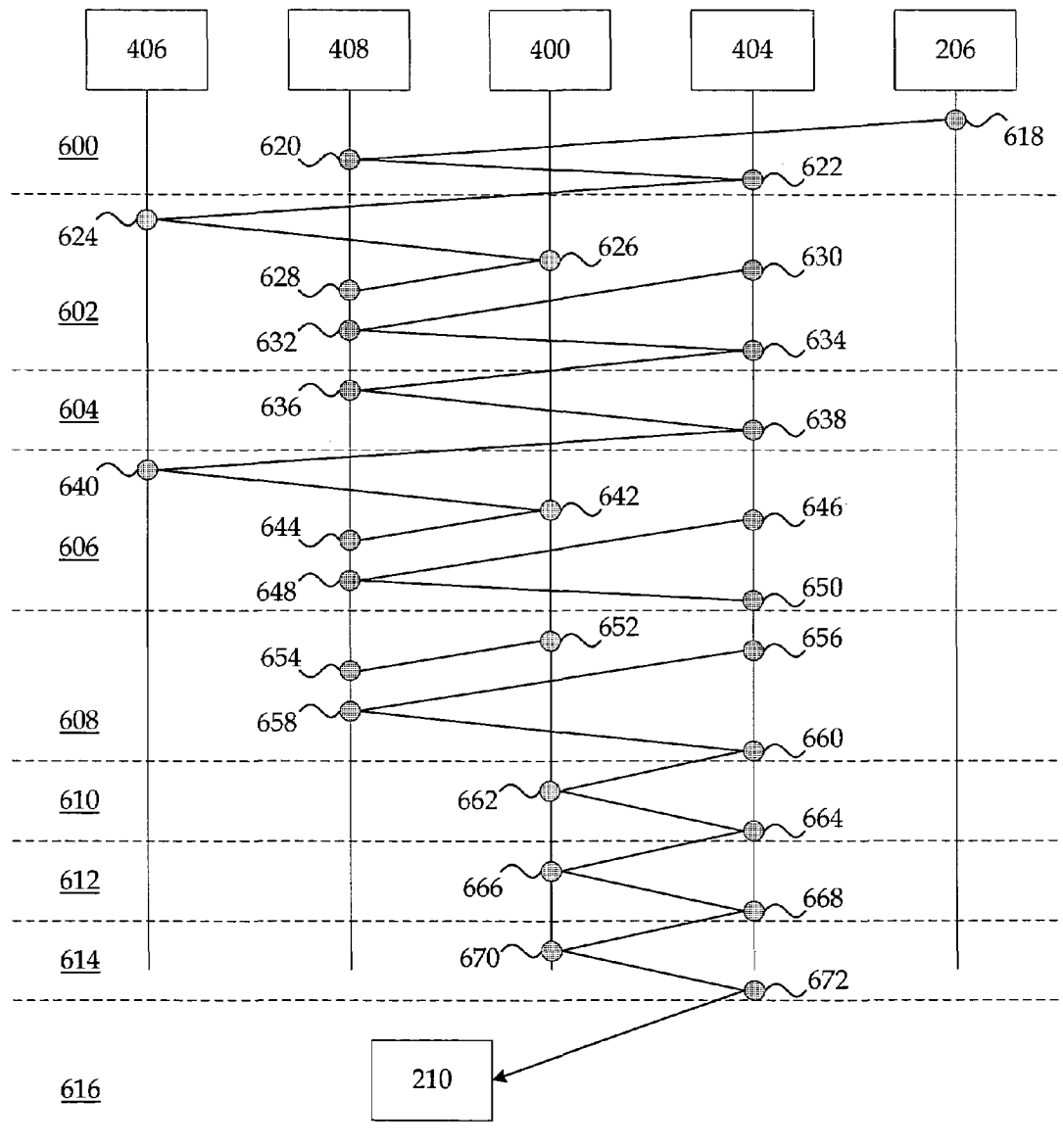
FIG. 6 is a data flow diagram of a portion of WCDMA Code Domain Power measurements performed according to the flowchart shown in FIG. 5.

Referring now to FIG. 6, there is shown a data flow diagram of a WCDMA Code Domain Power measurements performed according to the flowchart shown in FIG. 5. Code Domain Power (CDP) provides the distribution of power in the code channels for a WCDMA (wideband code division multiple access) cellular telephone system. The CDP measurement can be used to verify the various channels are at expected power levels and to determine when one code channel is leaking energy into the other code channels.

The measurement algorithms include I and Q data acquisition 600, symbol timing recovery 602, pilot recovery 604, carrier recovery 606, complementary receiver filter 608, de-scrambler 610, Hadamard Transform 612, power accumulator 614, and Code Domain Power (CDP) data retrieval 616. Those skilled in the art will appreciate that other measurement algorithms may be included in the WCDMA CDP measurements, such as, for example, channel and global Error Vector Magnitude (EVM) measurements.

In the I and Q data acquisition algorithm 600, the IF digital signal output from ADC 206 (point 618) is transmitted to the FPGA 400, which in turn transmits the data to ASICs 408 (point 620). ASICs 408 and FPGA 400 convert the IF digital signal into a baseband signal that includes I and Q data. The calibrated I and Q data are then stored in memory 404 (point 622).

The symbol timing recovery algorithm 602 estimates the timing of the signal symbol clock under test. Initially, a portion of the calibrated I and Q data are read from memory 404 and transmitted to FPGA 400, which in turn transmits the data to microprocessor 406 (point 624). The microprocessor 406 estimates the signal timing offset and returns values to FPGA 400 (point 626). The FPGA 400 then transmits the ASIC parameters to configure the ASICs 408 (point 628).

Next, all of the calibrated I and Q data are read from memory 404 (point 630) and transmitted to ASICs 408 via FPGA 400, where one or more ASICs 408 process the data (point 632). The timing-compensated data are then transferred to FPGA 400, which in turn stores the data in memory 404 (point 634).

The pilot recovery algorithm 604 correlates the signal under test with an internally generated reference signal. The timing-compensated data are read from memory 404 and transmitted to FPGA 400, which in turn passes the data to ASICs 408. ASICs 408 correlates the two signals (point 636) to align the signal under test with the reference signal. The aligned receiver data are then passed to the FPGA 400, which transfers the data to memory 404 for storage (point 638).

The carrier recovery algorithm 606 estimates and compensates for frequency errors and phase offset in the signal under test. Initially a portion of the data is read from memory 404 and transmitted to FPGA 400, which in turn passes the data to microprocessor 406. The microprocessor 406 estimates the carrier frequency and phase error of the data (point 640) and returns values for the frequency error and phase offset to the FPGA 400 (point 642). FPGA 400 then transmits the ASIC parameters to configure the ASICs 408 (point 644).

Next, all of the data are then read from memory 404 (point 646) and transmitted to ASICs 408 via FPGA 400. ASICs 408 compensate for the frequency error and phase offset (point 648). The frequency/phase compensated data are then transferred to FPGA 400, which in turn stores the data in memory 402 (point 650).

The complementary receiver filter algorithm 608 removes intersymbol interference introduced during signal transmission. FPGA 400 transmits the ASIC parameters to configure the ASICs 408 for the desired receiver filter coefficients (points 652 and 654). Then the frequency/phase compensated data are read from memory 404 (point 656) and transmitted to FPGA 400, which in turn passes the data to ASICs 408. ASICs 408 process the data (point 658) and return filtered data to the FPGA 400. FPGA 400 then transmits the filtered data to memory 404 for storage (point 660).

FPGA 400 performs the de-scrambler algorithm 610. The filtered data are read from memory 404 and transmitted to the FPGA 400 for processing (point 662). The de-scrambled data are then returned to memory 404 for storage (point 664). FPGA 400 also performs the Hadamard Transform 612, which projects the receiver signal onto orthogonal channels. The de-scrambled data are read from memory 404 and transmitted to FPGA 400 for processing (point 666). The data are then returned to memory 404 for storage (point 668).

The power accumulator algorithm 614 calculates the average channel power. The data are read from memory and passed to FPGA 400 for processing (point 670). The average channel power is then stored in memory 404 (point 672). And finally, the data is transferred to the host 210 for the CDP data retrieval 616.

Although the FIG. 6 embodiment has been described with reference to the WCDMA CDP measurement, other embodiments in accordance with the invention are not limited to the specific digital communication format and to this application. Embodiments in accordance with the invention can process other types of baseband measurements and communication formats. Examples of other types of communication formats include, but are not limited to, WCDMA, CDMA2000, 1xEV-DO, 1xEV-DV, TD-SCDMA, GSM, EDGE, CDMAOne, NADC, and general digital demodulation analysis such as nPSK, nQAM, MSK, FSK, and VSB. Examples of other measurement algorithms include, but are not limited to, EVM, frequency and phase measurements, code domain power, channel EVM and global EVM for CDMA systems, and code domain error.

The invention claimed is:

1. A system for distributing data for processing according to a plurality of baseband measurement algorithms, comprising:
   a software component, a hardware component, and a memory logically connected to a controller, wherein the controller controls the flow of data in and out of the memory and selects which component processes data for each baseband measurement algorithm based on the type of baseband measurement algorithm and the current state of the hardware and software components at the time said data is available to be distributed.

2. The system of claim 1, wherein the hardware component comprises a field programmable gate array.

3. The system of claim 2, wherein the hardware component further comprises an application specific integrated circuit.

4. The system of claim 1, wherein the controller comprises a microprocessor.

5. The system of claim 1, wherein the software component comprises software running on a microprocessor.

6. A system for distributing data for processing according to a plurality of baseband measurement algorithms, comprising:
   a software component, a hardware component, and a memory logically connected to a controller, wherein the controller controls the flow of data in and out of the memory and selects which component processes data for each baseband measurement algorithm based on the type of baseband measurement algorithm and the current state of the hardware and software components; and
   a host receiving the processed data.

7. The system of claim 6, wherein the host performs post-processing operations on the processed data.

8. The system of claim 7, wherein the host displays the processed data.

9. A baseband measurement system, comprising:
   a sub-system processing baseband data according to a plurality of baseband measurement algorithms, wherein the sub-system includes a hardware component, a software component, and a memory logically connected to a controller, and wherein the controller controls the flow of data in and out of the memory and selects which component processes data for each baseband measurement algorithm based on the type of baseband measurement algorithm and the current state of the hardware and software components; and a host receiving the processed baseband data and displaying the processed baseband data.

10. The system of claim 9, wherein the hardware component comprises a field programmable gate array.

11. The system of claim 10, wherein the hardware component further comprises an application specific integrated circuit.

12. The system of claim 9, wherein the controller comprises a microprocessor.

13. The system of claim 9, wherein the software component comprises software running on a microprocessor.

14. A method for processing data according to a plurality of baseband measurement algorithms, comprising:
   a) determining whether data to be processed according to a particular baseband measurement algorithm is to be processed by a hardware component or by a software component based on the type of the particular baseband measurement algorithm and the current state of the hardware and software components;
   b) transferring the data to an appropriate component for processing;
   c) processing the data according to the particular baseband algorithm; and repeating a), b), and c) until all of the baseband measurement algorithms have been performed.

15. The method of claim 14, further comprising:
   storing the data after the data is processed by the appropriate component; and
   accessing the data prior to transferring the data to a next appropriate component.

16. A method for processing data according to a plurality of baseband measurement algorithms, comprising:
   a) determining whether data to be processed according to a particular baseband measurement algorithm is to be processed by a hardware component or by a software component based on the type of the particular baseband measurement algorithm and the current state of the hardware and software components;
   b) transferring the data to an appropriate component for processing;
   c) processing the data according to the particular baseband algorithm; and
   repeating a), b), and c) until all of the baseband measurement algorithms have been performed;
   wherein determining whether data to be processed according to a particular baseband measurement algorithm is to be processed by a hardware component or by a software component comprises:
   determining whether the particular baseband measurement algorithm includes complex iterative processing or complex branching;
   if the particular baseband measurement algorithm does include complex iterative processing or complex branching, transferring the data to a software component for processing;
   if the particular baseband measurement algorithm does not include complex iterative processing or complex branching, determining whether the particular baseband measurement algorithm includes digital signal processing;
   if the particular baseband measurement algorithm does include digital signal processing, transferring the data to a hardware component for processing;
   if the particular baseband measurement algorithm does not include digital signal processing, determining whether the particular baseband measurement algorithm is optimized for a particular component;
   if the particular baseband measurement algorithm is optimized for a particular component, transferring the data to the particular component for processing; and
   if the particular baseband measurement algorithm is not optimized for a particular component, balancing the processing of the data between a hardware component and a software component based on the type of the particular baseband measurement algorithm and the current state of the hardware and software components.

* * * * *